US009527928B2

(12) United States Patent
Binder

(10) Patent No.: US 9,527,928 B2
(45) Date of Patent: Dec. 27, 2016

(54) ANHYDROUS CORN PROCESSING

(71) Applicant: ARCHER DANIELS MIDLAND COMPANY, Decatur, IL (US)

(72) Inventor: Thomas P. Binder, Decatur, IL (US)

(73) Assignee: Archer-Daniels-Midland-Company, Decatur, IL (US)

( * ) Notice: Subject to any disclaimer, the term of this patent is extended or adjusted under 35 U.S.C. 154(b) by 166 days.

(21) Appl. No.: 14/390,812

(22) PCT Filed: May 8, 2013

(86) PCT No.: PCT/US2013/040023
§ 371 (c)(1),
(2) Date: Oct. 6, 2014

(87) PCT Pub. No.: WO2013/173134
PCT Pub. Date: Nov. 21, 2013

(65) Prior Publication Data
US 2015/0322172 A1 Nov. 12, 2015

Related U.S. Application Data

(60) Provisional application No. 61/646,935, filed on May 15, 2012.

(51) Int. Cl.
*C08B 30/04* (2006.01)
*A23D 9/02* (2006.01)
*C11B 1/10* (2006.01)
*C11B 3/00* (2006.01)

(52) U.S. Cl.
CPC .............. *C08B 30/044* (2013.01); *A23D 9/02* (2013.01); *C11B 1/10* (2013.01); *C11B 3/008* (2013.01)

(58) Field of Classification Search
None
See application file for complete search history.

(56) References Cited

U.S. PATENT DOCUMENTS

| 3,296,245 A * | 1/1967 | Kaiser | C07H 15/04 536/18.6 |
| 3,414,530 A * | 12/1968 | Zilkha | C08B 31/00 536/103 |
| 7,566,470 B2 * | 7/2009 | Vasanthan | C08B 37/0024 426/429 |

* cited by examiner

*Primary Examiner* — Melvin C Mayes
*Assistant Examiner* — Stefanie Cohen
(74) *Attorney, Agent, or Firm* — Corey M. Crafton

(57) ABSTRACT

Anhydrous methods of fractionating corn grain that do not require the use of water but rather depends on use of organic solvents are described. The methods include contacting whole grain corn flour with a at least one organic solvent selected from the group consisting of a C1-C6 alcohol, ketone, ester or furan to form an admixture having no more than 15% w/w water. The admixture is separated into i) a solids fraction enriched with corn fiber and protein and 2) a liquid organic slurry comprising suspended starch, dissolved corn oil and the organic solvent. The starch is separated from the first organic slurry to obtain a solvent extracted solid starch fraction and a clarified organic solution. The clarified organic solution which contains dissolved oils is retained and may be evaporated to obtain corn oil that can be further refined.

19 Claims, 4 Drawing Sheets

ANHYDROUS CORN PROCESSING

CROSS REFERENCE TO RELATED APPLICATION[S]

This Application is a 35 U.S.C. §371 national phase entry of PCT application No. PCT/US2013/040023 filed May 8, 2013, which claims priority to U.S. Provisional Application No. 61/646,935 filed May 15, 2012.

BACKGROUND

Processing corn grain to yield component parts of the grain as animal feed, human food and feedstocks for industrial processes such as fermentation to make ethanol may broadly be divided into two categories—wet milling and dry milling.

In a classical wet milling operation the corn grain is "steeped" (typically for 22-50 hours at about 50° C.) in an aqueous solution often including small amounts of a mild sulfur acid compound such as sulfur dioxide, hydrogen sulfide, sulfuric acid or calcium sulfate which loosens the pericarp (bran) tissue from the interior endosperm and more importantly, from the germ tissue. The water usage in a corn steeping operation is high, on the order of 5-9 gallons per bushel. The endosperm and germ tissue are separated from each other and from the loosened pericarp by filtration and differential floating in an aqueous solution involving additional inputs of water. Corn oil is extracted from the separated germ using a hydrophobic organic extractant such as hexane, leaving behind a protein enriched de-oiled germ cake useful as animal feed. Through a multi-step process involving further uses of input water, protein is separated from the separated pericarp and endosperm fractions forming a protein enriched product denoted "corn gluten", which in various degrees of purity may be called corn gluten feed, or corn gluten meal. The residual pericarp tissue denoted "corn fiber" is typically used solely for animal feed purposes, while the highly purified starch granules of various dimensions from the endosperm may be used for a variety of purposes, including for example to make fermentation products, which are made by liquification and saccharification of the starch to form dextrose to feed the fermentation organism to make the fermentation product—for example, ethanol. The starch granules may also be separated into various sizes and or ground into human food products such as corn grits and corn starch. The final corn fiber, corn gluten, and corn gluten feed products are sold in the market for additives to animal feed.

In a conventional "dry grind" process less water is used and the equipment costs for a plant are less. Typically the corn is briefly "tempered" with a small amount of water without a sulfur compound to bring the grain to a moisture content of 14-20% to loosen the pericarp. The tempered grain is then subject to grinding to form coarse corn grain flour with the endosperm and germ exposed. Starch in the exposed endosperm tissue is saccharified and liquefied to form dextrose. The entire cracked and liquefied mixture including the pericarp and germ tissue is used for a fermentation process to yield, for example, ethanol. Ethanol is separated from the fermentation broth by distillation and the residual germ, pericarp, and undigested starch components of the grain, along with the yeast biomass made during the fermentation process are dried to form a product called "distillers dried grains" (DDGs) which are useful as an animal feed ingredient.

There are various modifications of the dry grind process denoted "modified dry grind corn" processing that may include additional or intervening steps such as aspiration, sieving, floatation and/or filtration to at least partially separate at least one of the pericarp and germ fractions from the endosperm fraction prior to saccharification for fermentation. These partially separated fractions are less pure than those obtained from a wet grind operation, but may be used for products similar to those obtained from wet grind process. For example corn oil may be obtained from the partially separated germ and the extracted germ cake may be used as an additive for animal feed.

The two types of processes have their respective advantages and disadvantages. In a wet milling process, the best advantage is that the separated components are of relatively high purity and the product streams can be diverted to several different commercial forms depending on market conditions. The biggest disadvantage is high equipment cost, which is only justifiable for large scale corn grinding operation. The second biggest disadvantage in wet milling is that it consumes large amounts of water. A wet milling operation in total uses upwards of 20 gallons of water per bushel. This increases operating costs because the water must be paid for, reclaimed and recycled.

Conversely for a dry milling process, the best advantage is relatively low cost for equipment and water usage. A dry milling operation uses approximately 0.1 gallons of water per bushel for the tempering process. Of course plant construction costs are increased with modified dry grind operations the more such modifications approach wet mill operations in terms of grain component separation. The biggest disadvantage in dry grind is limited product diversity due to lower purity in separations. To be cost effective, the majority of the revenue from a dry grind plant must be obtained from ethanol or other fermentation product produced, because the only product other than the one made by fermentation is the resulting DDG byproduct, which has relatively low value.

While both wet mill and dry mill operations have their respective advantages, they share a common disadvantage in that they incur a substantial cost in the consumption and handling of water. The steep water from a wet grind operation (corn steep liquor) contains organic acids, some volatile hydrocarbons, sugars, and minerals that cannot be discharged into the environment under most water regulation schemes. Those components must be removed by reclamation of the steep water, which may include use of a portion thereof as an additive in a fermentation process that will consume some of the materials in the corn steep liquor as a nutrient source. The tempering water used in a dry grind operation is typically carried with the corn grain through the dry milling and fermentation processes and not recovered until after distillation to make ethanol, where it is recovered as a the fraction of water remaining after distillation, and evaporation of the fermentation media, known as "backset" Backset is also obtained in wet dry operations where ethanol is made by fermentation of the starch. A portion of the backset water may be recycled for use in another round of fermentation, however, backset contains organic acids that inhibit growth of yeasts, and so only limited amounts of backset may be recycled. The rest must be cleaned.

It would be beneficial to develop a cost effective corn processing operation that did not rely on use of water, but that would also form products suitable for use as food, feed, fermentation and other industrial products at yields that would be economical in comparison to conventional dry grind and wet grind corn processing operations.

SUMMARY

Disclosed herein are anhydrous methods of fractionating corn grain that do not require the use of water but rather depend on use of organic solvents. The methods generally include, contacting whole grain corn flour with a sufficient amount of at least one $C_1$-$C_6$ solvent organic solvent selected from the group consisting of an alcohol, ketone, ester or furan to form an admixture having no more than 15% w/w water. The $C_1$-$C_6$ solvent may be linear, branched or cyclic. The admixture is separated into i) a first solids fraction enriched with corn fiber and protein and 2) a first liquid organic slurry comprising suspended starch, dissolved corn oil and the organic solvent. The starch is separated from the first organic slurry to obtain a solvent extracted solid starch fraction and a clarified organic solution. The clarified organic solution which contains dissolved oils is retained, and may optionally be evaporated to obtain crude corn oil. In certain embodiments the first admixture has a water content of no more than 10% wt/wt. In certain embodiments the first admixture has a water content of no more than 5% wt/wt.

In a more optimal process, the method may further include contacting the first solids fraction with a second amount of the organic solvent to form a second admixture having no more than 15% w/w water and separating the second admixture into 1) a second solids fraction enriched with the corn fiber and protein and 2) a second liquid organic slurry fraction comprising suspended starch, dissolved corn oil and the organic solvent. In this more optimal method, separating starch includes separating the starch from the first and second organic slurries to obtain a combined solids starch fraction and a combined clarified organic solution; and also retaining the clarified organic solvent includes retaining the combined clarified organic solution. In certain embodiments the first and second admixture have a water content of no more than 10^% and in certain embodiments no more than 5% wt/wt.

The starch recovered from at least the first, but certainly from the combined first and second organic slurry fractions totals at least 50% of the starch present in the ground corn flour. The starch in the slurry is in suspension rather than dissolved. Accordingly the starch from the organic slurry can be separated by physical means that include at least one of a density separation and filtration. The density separation, for example, may include gravity settling or centrifugation of the organic slurry fraction. When desired, the solvent may be evaporated from the solvent extracted starch fraction to obtain a purified starch fraction. Similarly, the method may further include evaporating the organic solvent from the separated solids fraction forming a fiber and protein enriched product—i.e., bran flakes, having the bulk of the fiber and some residual starch that is useful for processing into a food product suitable for human consumption.

In typical embodiments, separating the organic slurry fraction from the solids fraction comprises sieving at least one of the first and second admixtures through a screen, mesh or plate having openings of a size corresponding to a maximum of 80 mesh and a minimum of 200 mesh, wherein the organic slurry passes through the openings.

Typically, contacting the corn oil or retained solids fraction with the organic solvent is done at a temperature between 50° C. and the boiling point of the organic solvent. In preferred practices, the $C_1$-$C_6$ organic solvent is at least one solvent selected from the group consisting of ethanol, ethyl acetate, and acetone. In certain embodiments the $C_1$-$C_6$ organic solvent is a furan compound. In certain embodiments the furan compound is tetrahydrofuran. In a particularly preferred practice, the $C_1$-$C_6$ organic solvent is ethanol. When the $C_1$-$C_6$ organic solvent is ethanol the solvent extracted starch fraction may additionally be contacted with a mineral acid for a time sufficient to form ethylglycosides from the recovered starch. In another preferred practice, the $C_2$-$C_4$ organic solvent is ethyl acetate, in which case the solvent extracted starch fraction may be further contacted with a base for a time sufficient to form an acetyl starch ester of the recovered starch.

In ordinary embodiments, contacting the corn flour with the organic solvent is done while agitating the admixture. For example in some embodiments the agitation involves tumbling of the admixture, or in may include the admixture in presences of inert solid objects. In other embodiments the physical agitation comprises turbulence from rotation of at least one of a paddle and a screw member. In more desirable embodiments, the physical agitation occurs simultaneously with forming the admixture and separating the starch slurry. For example, in using an exemplary apparatus depicted in FIG. 2, separating the admixture into the first solids the first liquid organic slurry comprises, conveying the admixture from a first end through to a second end of a barrel assembly having walls with mesh openings corresponding to a maximum of 80 mesh and a minimum of 200 mesh. In such a case, the organic slurry is collected as an exit stream from the walls of the barrel assembly while the first solids fraction is collected as exit stream from the second end of the barrel assembly. In such embodiments, the organic solvent is introduced into the barrel assembly in a flow direction opposite the direction the solids fraction exits from the barrel assembly. In one exemplary apparatus, the barrel assembly comprises at least a first segment and a second segment, and the organic solvent is contacted with the corn flour separately in the first segment and again in the second segment, while the starchy slurry is separated from the admixture in the segments.

DETAILED DESCRIPTION

The present disclosure provides anhydrous methods for processing corn grain into food, feed and chemical products that do not rely on the use of water in the fractionation of the grain The methods overcome several limitations of conventional corn wet milling and dry processes by eliminating the steeping or tempering and germ handling steps, and by reducing fresh water usage. The process is based on using a $C_1$-$C_6$ organic solvent that is at least one solvent alcohol, ester, ketone, or a furan compound or mixtures of the same. In certain practices the $C_1$-$C_6$ organic solvent has no more than 4 carbons. The process is exemplified using ethanol, ethyl acetate and acetone, for fractionating the corn into starch, oil, and protein enriched fractions. Because of the relatively low boiling points and heats of vaporization of such solvents, the solvents can be readily recovered by evaporation and recycled for use the process, thus reducing processing costs, energy and eliminating the need for water reclamation. An added benefit of using organic solvents when the intention is to manufacture modified starches is the ability to carry out derivitazations where water is detrimental to such derivitizations without needing to dry the starch.

Figure 1:
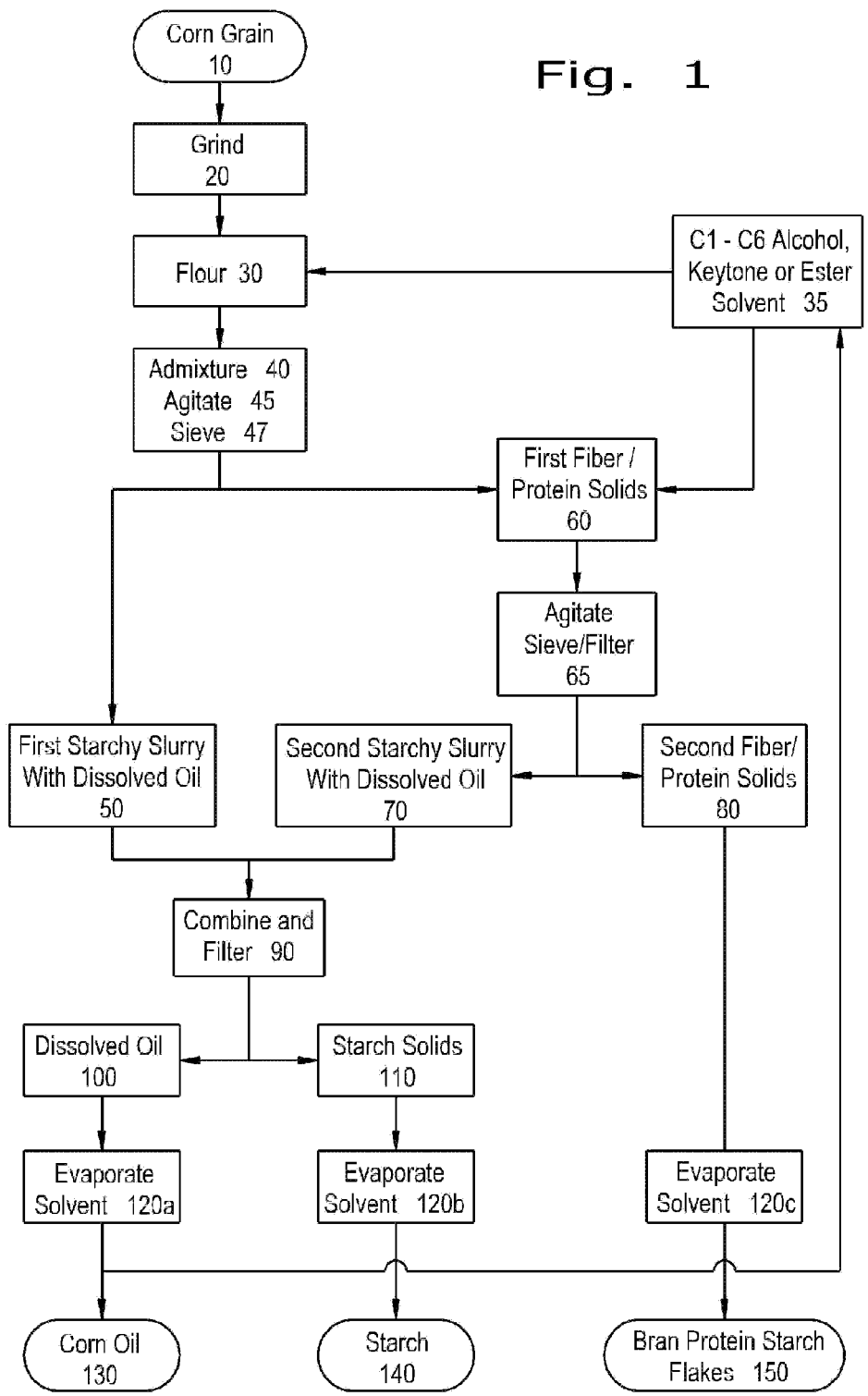
FIG. 1 diagrams an anhydrous corn grain processing method as described herein.

FIG. 1 illustrates an anhydrous method of corn fraction of the present invention. Corn grain 10 is subject to grinding 20 to form corn flour 30. In typical practices the whole corn grain is ground so the corn flour 30 may be termed "whole corn flour," however, in some practices the flour 30 may be subjected to additional processes to remove some of the component parts and still be useful for the present methods. The size of the ground corn flour 30 particles should preferably be smaller than 18 mesh (i.e., smaller than 1000 microns) but greater than a selected size of 80, 100 or 200 mesh (i.e., greater than 177, 149 or 74 microns). About 3-4 parts of an organic solvent 35 selected from the group consisting of a $C_1$-$C_6$ alcohol, ketone or ester is mixed with 1 part of corn flour 30 forming a solvent flour admixture 40.

The amount of solvent 35 to add should be sufficient so that the admixture contains less than 15% wt/wt water, preferably less than 10% and still more preferably less than 5% wt/wt water, inclusive of the moisture content contributed by the corn grain 10. The maximum water content will depend on the midpoint of relatively solubility of protein and oil in water and the solvent. For example, corn proteins (zeins) begin to be insoluble in ethanol at about 75% wt/wt to water while oil starts to become maximally soluble at 95% ethanol, hence a mid-point is about 85% ethanol corresponding to no more than 15% wt/wt water. In contrast, for isoproponol the protein begins to become insoluble at 88% wt/wt and oil is maximally soluble at 97% wt/wt, so a midpoint is no more than 8.5% water.

The admixture 40 is agitated 45 by naked tumbling, tumbling in the presence of inert ceramic spheres, mixing, screw extrusion, paddling or other suitable means at an elevated temperature that is preferably greater than 50° C. and up to the boiling point of the solvent 35. In an exemplary practice using ethanol as the solvent 35 the temperature was 70° C.

The agitation 45 is done for a time and with sufficient mechanical energy to separate out the starch 140 in the flour 30 in the form of granules smaller than the selected 80-200 mesh size. Preferably the means selected for agitation 45 should not be so vigorous to cause shearing of bran (fiber) or germ particles in the flour 30 into sizes smaller than the selected mesh size. The agitated admixture 45 is filtered through a filter or screen of 80-200 mesh, which separates the admixture 40 into first liquid starchy slurry 50 that contains dissolved corn oil 130 and a first solids fraction 60 that is retained on the filter or screen of 80-200 mesh. A second amount of organic solvent 35 is added to the first solids fractions at 1-4 volumes, and a second round of agitation 65 at elevated temperature with filtering through the screen of 80-200 mesh is repeated, forming a second starchy slurry 70 containing dissolved oil, and a second solids fraction 80 enriched with fiber and proteins. The first and second starchy slurries 50 and 70 may be combined forming a combined starchy slurry 90 that contains at least 50% (typically 50%-60%) of the starch 140 from the original corn grain 10.

Figure 2A:
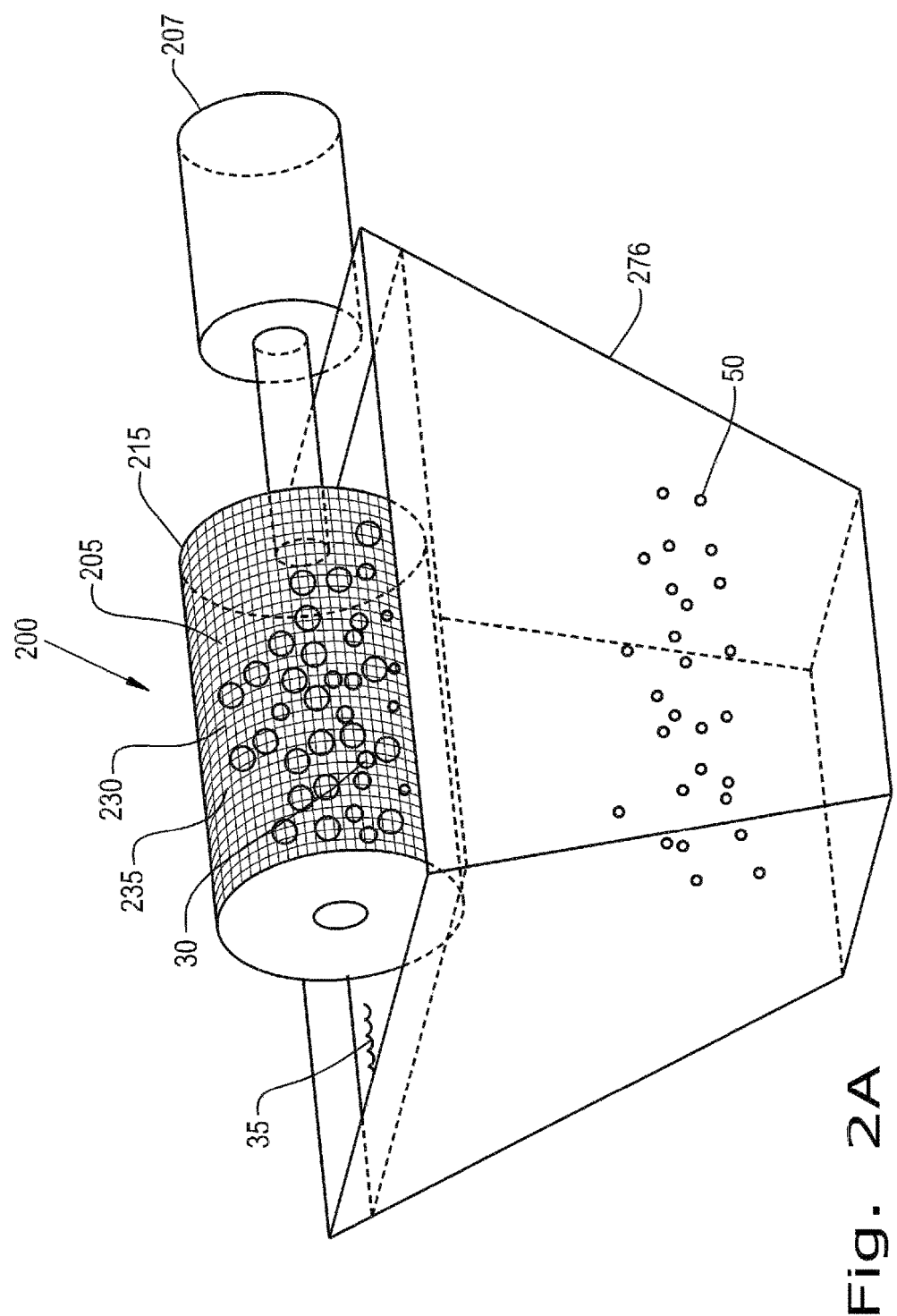
FIGS. 2A-2C depict various corn flour extraction apparatus for extracting starch granules with anhydrous solvents useful in the methods described herein.
Figure 2B:
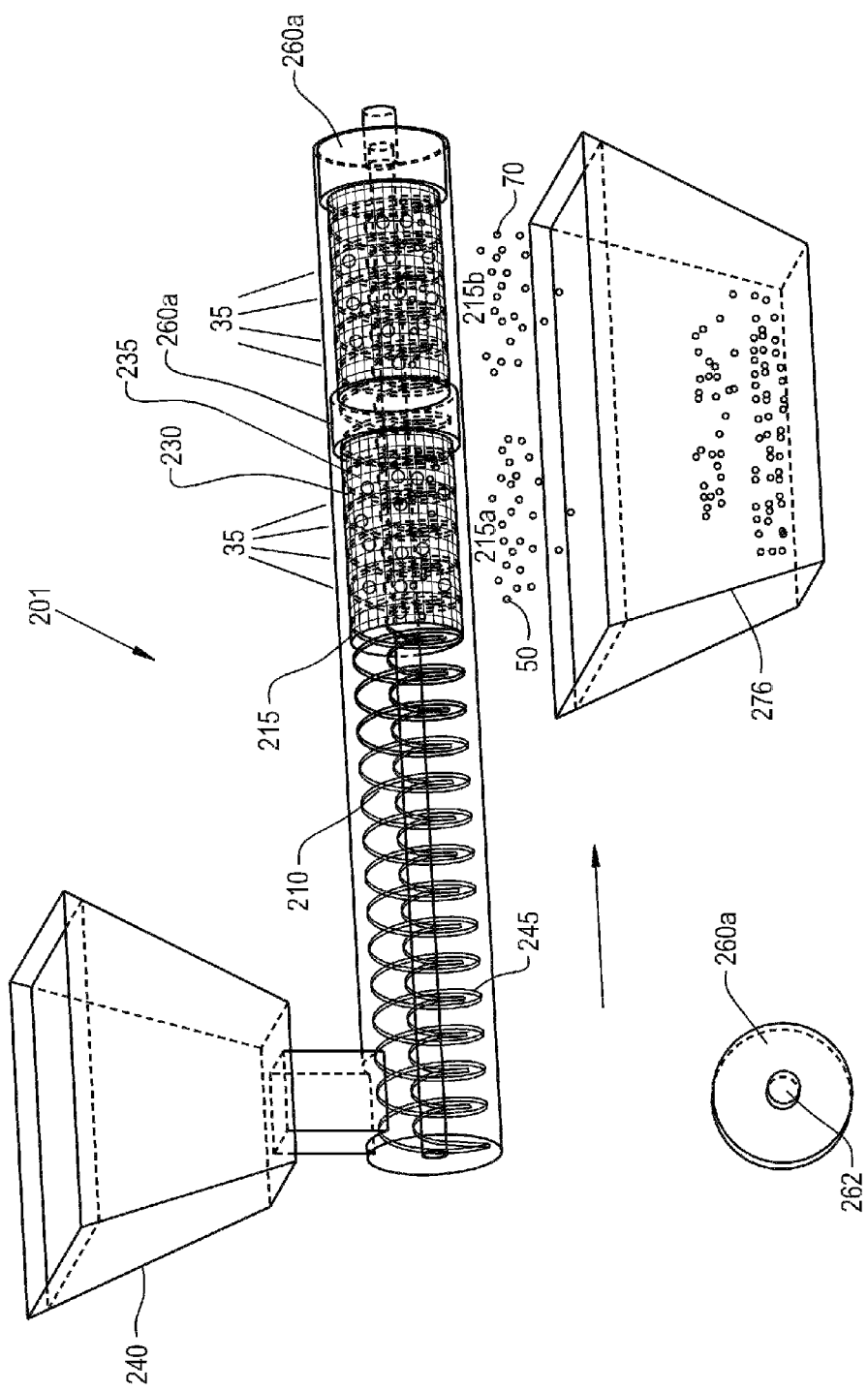
Figure 2C:
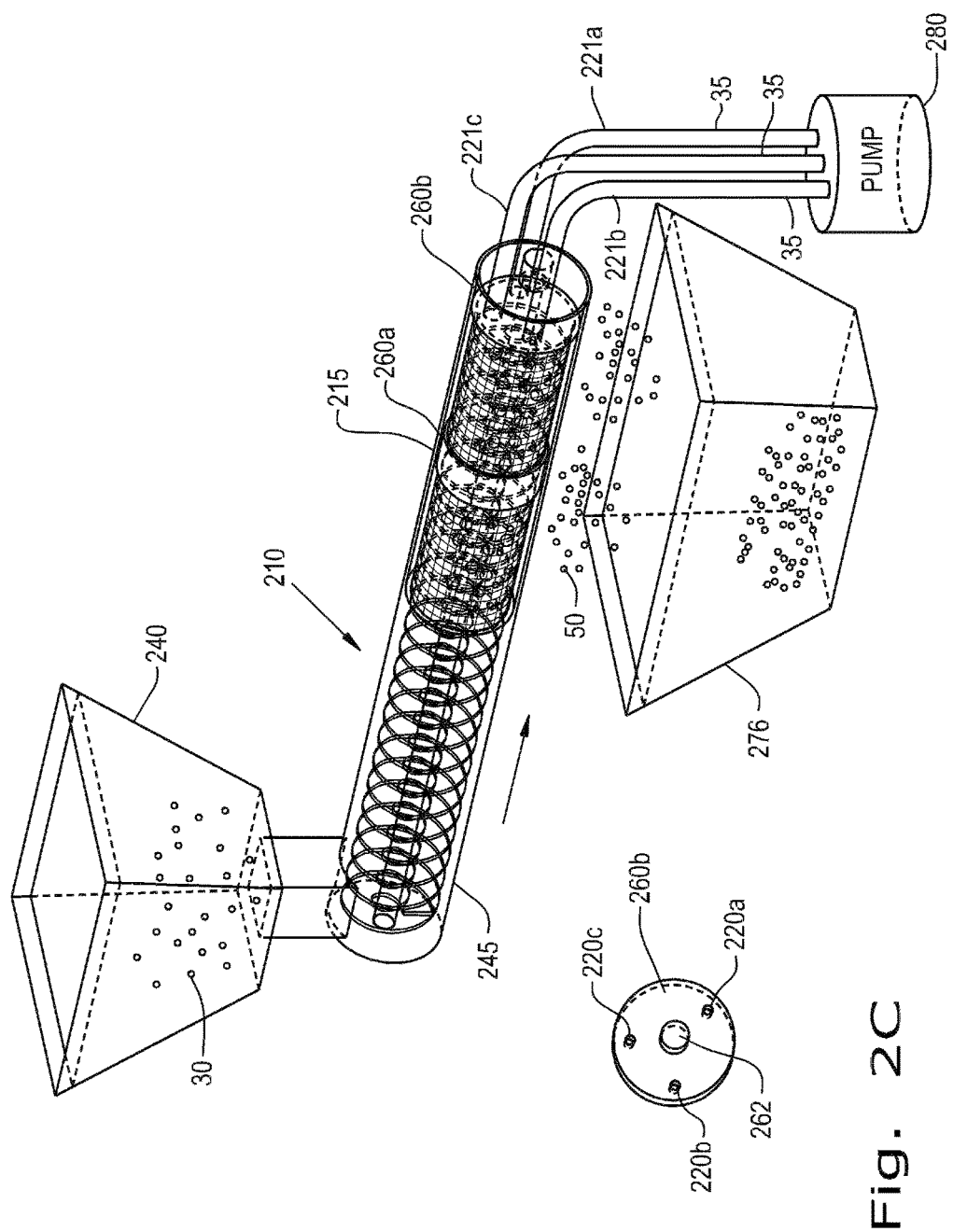

In a preferred process, mixing with the solvent 35, agitation 45 and sieving 47 of the starch slurries 50,70 is done simultaneously in a starch extraction apparatus. FIGS. 2A-2C depict examples of such a starch extraction apparatus. FIG. 2A depicts a prototype laboratory apparatus 200, which includes a motor 207 attached to a drive shaft 202 in turn connected to mesh barrel assembly 215. Mesh barrel assembly 215 has walls made of a mesh material 230 providing a plurality of openings 235 through which the starch granules of a size smaller than the openings 235 can pass through. The mesh barrel assembly 215 is loaded with ground corn flower 30 and optionally may be loaded with inert agitation balls 205 to provide further mechanical means for breaking the corn flour 30 to discharge the starch granules to form the starch/solvent slurry. The mesh barrel assembly 215 is immersed or partially immersed in the organic solvent 35 contained in a collection reservoir 276. In operation, the motor 207 rotates the barrel assembly 215 in the collection reservoir 276 so that the rotary action combined with the agitation provided by agitation balls 205 in the presence of the organic solvent 35 breaks the corn starch into starch granules that pass through the openings 235 to be collected as the slurry 50 in reservoir 276.

In a high throughput system depicted in FIG. 2B, the apparatus 201 may contain a paddle, screw or other mechanical convection means 210 disposed within a barrel assembly 245 that contains at least one, but preferably two or more mesh barrel elements 215a and 215b. At least a portion of the walls of mesh barrel elements 215a and 215b are formed of the mesh material 230 providing the openings 235, preferably corresponding to the openings of a 80 to 200 mesh screen. A distal region of barrel assembly 245 having solid walls 215 is located at one end of the apparatus 201. The opposite distal end of the barrel assembly 245 has a final exit plate 260a that contains exit port 262 being an orifice smaller than the inner diameter of the barrel assembly 245. Optionally, an additional exit plate 260a may also be positioned between mesh barrel element 215a and 215b so that material is conveyed from mesh barrel element 215a through the exit port 262 in the first plate assembly 260a into the second mesh barrel element 215b before exiting from the final exit plate assembly 260a at the end of mesh barrel 215b.

In operation, ground corn flour 30 is introduced via entry hopper 240 located at the closed wall end of barrel assembly 245 and is urged toward final exit plate 260a by rotation of the convection screw 210 in a first direction. Simultaneously, mesh barrel elements 215a and 215b are rotated in the opposite direction of convection screw assembly 210. Solvent 35 is independently introduced into mesh barrel elements 215a and 215b. One manner of introduction may be by spraying the solvent 35 through the mesh walls 230. A first starch slurry 50 emerges through holes 235 in mesh 230 of mesh barrel element 215a and is collected in collection reservoir 276. As result, a first fiber protein solids fraction 60 partially depleted of starch is formed by passage of the flour 30 through the first mesh barrel assembly 215a and emerges through the first exit plate 260a, after which it is urged into second mesh barrel assembly 215b by continued rotation of the convection screw assembly 210. In mesh barrel assembly 215b more solvent 35 is introduced to contact the conveyed first fiber protein solids fraction 60. A second starch slurry 70 emerges from sub barrel assembly 215b through holes 235 and combines in collection reservoir 276 with the first starch slurry 50. Finally a second fiber/protein solids fraction further depleted of starch emerges from the final exit port 262 in end plate 260a of the meth barrel assembly 215b where it is collected for further processing.

Another exemplary embodiment of high through put solvent extraction apparatus 202 is depicted in FIG. 2C. In this embodiment the solvent is introduced into barrel assembly 245 in a counter current direction to the convection of the flour 30. This may be accomplished, for example, by using a bearing end plate assembly 260b that contains ports 220a, 220b and 220c that allows the solvent 35 to be pumped from pump 280 through conduits 221a, 221b and 221c in a flow direction that is counter current to the flow direction of the corn flour 30 as it is urged through the barrel assembly toward bearing exit plate 260b. Such an embodiment results in a gradient of starch slurry extraction over the length of the barrel assembly 245 with a similar effect as first and second solvent extractions that yield slurries 50 and 70.

Returning to FIG. 1, the starch 140 is recovered from the combined starchy slurry 90 by a suitable solids separation step, such as filtration through a filter having pores smaller than the slurried starch granules, by gravity settling, or by centrifugation forming a solvent permeate (or supernatant) solution 100 containing dissolved corn oil 130 separated from the fraction containing starch solids 110. At steps 120a, 120b and 120c the solvent 35 is evaporated from the permeate (or supernatant) solution 100, from the starch solids fraction 110 and from the second fiber solids fraction 80, respectively. After evaporation the three products recovered from the process are crude corn oil 130, starch 140, and a depleted whole grain flake fraction 150 enriched with protein and bran.

Depending on the organic solvent selected, approximately 80% or more of the corn oil in the starting corn grain 10 may be recovered in the corn oil fraction 130, which may be further refined by ordinary corn oil refining techniques. For example, in a laboratory test with ethanol as the solvent, 79% of the oil was recovered. Approximately 50-60% of the starch in the starting corn grain 10 is recovered in the starch fraction 140, which may be used for animal feed or human food products. The recovered starch fraction 140 is about 91% starch, 6.5% protein, 1.5% bran (fiber) and about 1% ash. Alternatively, rather than evaporating the solvent form starch solids fraction 110, that solvent extracted fraction may be directly treated with a catalyst to make modified starches with the residual solvent functioning as a reagent as described hereafter. The depleted whole grain flake fraction 150 is about 75% starch, 12% protein, 11% bran and about 2% ash, accounting for 40-50% of the starch, about 92% of the bran and about 66% of the protein from the original corn grain 10. The depleted whole grain flake fraction 150 may be used directly as an animal feed supplement, may be further processed into human food products, for example by compression into breakfast cereal flakes, further grinding to form an oil depleted whole corn flour, used as a meat extender, or may be saccharified and liquefied into dextrose as done in an ordinary wet or dry grind operation and used as feedstock to make ethanol or other fermentation product. In the latter case, the byproduct of the ethanol fermentation process will be a depleted Distillers Dry Grains product (DDGs) having less oil content than ordinary DDGs.

In one further embodiment that includes further chemical conversion of the starch, if the $C_1$-$C_6$ solvent 35 is ethylacetate or other ester of the formula $R_1OOR_2$, the solvent fraction containing the starch can be directly converted to a corresponding starch ester. In such practices $R_1$ and $R_2$ are each a $C_1$-$C_5$ moiety in ester linkage where $R_1$ and $R_2$ may have the same or different number of carbons so long as the total of carbons from $R_1$ and $R_2$ is 6 or less. In the case of ethylacetate where X and R are both acetyl groups, the solvent extracted starch may be directly deriresevoirized into acetylated starch via interesterification by further contacting the solvent extracted starch with a homogenous base catalyst. In an exemplary practice, ethylacetate soaked starch 140 was further suspended in an additional 5 volumes of ethylacetate and contacted with sodium methoxide at 50° C. for one hour with refluxing, then dried. This resulted in a high degree of substitution (acetylation) on the order of 0.16 per residue, which is greater than achieved in typical acetylation reactions in aqueous solvents. Without being bound by theory, it is believed the solvent extracted starch having so little water content is a better reactant for esterification, reaction with epichlorohydrin, epoxides and other derivitizations because the absence of water avoids side reactions with the water itself. An added benefit of using a solvent is that higher levels of derivitizations are possible while retaining starch granular form since the deriresevoirized starch will have a lower solubility than possible in water. The acetylated starch may then be saccharified with acid and enzymes to form mono acyl aldosides, which are important industrial products that can be used as intermediates in the synthesis of surfactants.

In another extended embodiment involving further chemical conversion, if the $C_1$-$C_6$ solvent is an alcohol of the formula ROH, the solvent extracted starch may be directly deriresevoirized into the corresponding glycosides (R—O-Glucose$_n$) by further contacting the solvent extracted starch with a homogenous acid catalyst. In an exemplary practice, an ethanol soaked starch 140 was suspended in an additional 4 volumes of ethanol and contacted with toluene sulfonic acid at 165° C. for one hour with refluxing, then dried. Chemical analysis demonstrated conversion of 90% of the starch into soluble ethyl glucoside and other soluble ethyl glycosides$_n$ with ethyl glucoside (e.g, where n=1) accounting for 72% of the soluble material.

If the $C_1$-$C_6$ solvent 35 is tetrahydrofuran (THF) or a ketone, the solvent extracted starch may be directly deriresevoirized into a number of starch compounds that require inert organic solvents to promote the desired reaction or solubilize the other reactive reagent.

The use of a solvent other than water for starch isolation thus allows for a variety of modified starches to be made at lower cost since water removal is not needed. Many modifying agents for starch will also react with water which decreases chemical efficiency. Further, because starch is much less soluble in $C_1$-$C_6$ organic solvents than water, higher degrees of substitution are obtainable while still retaining starch granule structure than are possible to achieve in the presence of water.

Example 1

Starch Extraction with Ethanol 100 grams of ground whole corn at 15% moisture content (85% dry solids) was suspending in 300 ml of anhydrous ethanol and heated to 70° C. After holding for 10 minutes the liquid was separated over a 80 mesh screen (180 μm, 0.007 inch) yielding a first slurry permeate A and a first retentate. 200 ml of anhydrous ethanol was added to the first retentate and the mixture was shaken in a plastic container with 1 cm ceramic beads for 10 minutes. The liquid was again separated over a 80 mesh screen yielding a second slurry permeate B and a second retentate. Another 200 ml of ethanol was added to the second retentate and the mixture was again shaken and separated yielding a third slurry permeate C and a third retentate. The third retentate was place on a Buchner funnel with filter paper and washed with 100 ml of ethanol yielding a wash permeate D and 38 grams of a fourth retentate designated retentate E.

Permeates A, B, C and D were filtered in that order, on Whatman filter paper in a Buchner funnel which yielded 42 g dried starch solids designated retentate fraction F and clarified permeate G. Clarified permeate G was evaporated yielding 5 grams of oily residue. The samples were liquefied by digestion of the starch with glucoamylase. Initial analytical results of the compositions are shown in Table 1.

TABLE 1

| Sample info | Maltose g/kg | Dextrose g/kg | Nitrogen % | Ash % | Total Metals mg/kg |
|---|---|---|---|---|---|
| starch powder F | 56.12 | 934.76 | 1.03 | 1.10 | 6,904.7 |
| retentate E | 45.16 | 695.74 | 1.96 | 2.20 | 13,245.6 |

From these results it can be seen that the starch fraction was about 91% starch and the screen retentate was about 68% starch.

Example 2

Extraction with Ethanol, Acetone or Ethylacetate

A series of reactions was run testing different solvents under similar conditions. To a one liter reactor 50 grams of ground corn flour was added along with 150 ml of solvent. One cm ceramic beads were added to the reactor and the mixture was mixed for 1.5 hours to release starch granules that were still tied up an the matrix of components. After the 1.5 hours the mixture was screened thru a 80 mesh screen. The retentate was re-slurried at 60° C. with 100 ml ethanol and again filtered thru the screen. This was repeated one more time to wash any residual starch granules from the retained fiber and protein. The retentate was dried in a vacuum oven. The starch slurry collected thru the screen was filtered thru filter paper on a Buchner funnel and washed with 50 ml of ethanol. The retained starch was dried in a vacuum oven. The filtrate was evaporated to a constant weight. The ethanol extracted oil had a solid precipitate presumed to be residual protein. Analysis of the retentate, starch fraction and oil recovered is shown in Tables 2-7.

TABLE 2

| Solvent | Screen retentate-grams | Starch fraction grams | Oil-grams |
|---|---|---|---|
| ethanol | 1B-14.6 | 1A-25.3 | 1C-2 |
| ethanol | 2B_19.8 | 2A-22.6 | 2C-2.2 |
| acetone | 3B-19.5 | 3A-18.9 | 3C-1.4 |
| ethylacetate | 4B-20.66 | 4A-21.77 | 4C-1.6 |

TABLE 3

| NB ID | Sample info | DP2 g/kg | Dextrose g/kg | Nitrogen % | Ash % |
|---|---|---|---|---|---|
| 5374-199-1A | 1A - starch powder | 46.67 | 823.37 | 1.17 | 1.7 |
| 5374-198-2A | 2A - starch powder | 41.89 | 858.96 | 0.95 | 1.6 |
| 5374-199-3A | 3A - starch powder | 53.69 | 809.93 | 1.01 | 1.3 |
| 5374-199-4A | 4A - starch powder | 55.25 | 707.99 | 1.01 | 1.5 |

TABLE 4

| | | Carotenoids | | |
|---|---|---|---|---|
| NB ID | Sample info | Lutein mg/kg | Zeaxanthin mg/kg | Beta Carotene mg/kg |
| 5374-199-0C | crude corn oil | 3.67 | 3.97 | nd |
| 5374-199-1C | 1C - oil | 72.42 | 52.44 | 1.52 |
| 5374-199-2C | 2C - oil | 76.1 | 56.55 | nd |
| 5374-199-3C | 3C - oil | 22.58 | 12.75 | nd |
| 5374-199-4C | 4C - oil | 23.32 | 13.96 | nd |

TABLE 5

| | Major Fatty Acid Composition | | | | |
|---|---|---|---|---|---|
| | Palmitic % area | Stearic % area | Oleic % area | Linoleic % area | Linolenic % area |
| crude corn oil | 11.6 | 1.8 | 28.0 | 54.9 | 1.0 |
| 1C - oil | 11.1 | 1.9 | 29.8 | 51.8 | 1.3 |
| 2C - oil | 11.1 | 2.0 | 30.7 | 51.7 | 1.3 |
| 3C - oil | 10.7 | 2.0 | 30.3 | 52.6 | 1.4 |
| 4C - oil | 10.6 | 2.0 | 30.4 | 51.4 | 1.3 |

TABLE 6

| | Fats and Fatty Acids | | | |
|---|---|---|---|---|
| | Free fatty acids % | Mono-glycerides % | Di-glycerides % | Tri-glycerides % |
| crude corn oil | 1.4 | 0.1 | 2.2 | 95.4 |
| 1C - oil | 40.6 | 0.4 | 3.1 | 44.1 |
| 2C - oil | 32.9 | 0.3 | 3.3 | 53.9 |
| 3C - oil | * | * | * | * |
| 4C - oil | 34.1 | 0.2 | 2.7 | 46.5 |

TABLE 7

| | Major Phytosterol Compostion | | | | | | |
|---|---|---|---|---|---|---|---|
| | Campesterol mg/kg | Stigmasterol mg/kg | Sitosterol mg/kg | Sitostanol mg/kg | OS avenasterol mg/kg | 7 avenasterol mg/kg | Total Tocopherols mg/kg |
| crude corn oil | 1,357 | 643 | 3,507 | 118 | 154 | 32 | 1,206 |
| 1C - oil | 1,498 | 1,008 | 4,515 | 552 | 542 | 1,175 | 1,455 |
| 2C - oil | 1,700 | 953 | 4,943 | 496 | 424 | 654 | 1,201 |
| 3C - oil | 826 | 466 | 2,449 | 216 | 311 | 969 | 961 |
| 4C - oil | 1,314 | 515 | 3,965 | 355 | 477 | 880 | 922 |

The results indicated that all three solvents produced a starch fraction enriched in starch and performed similarly as far as yields of the protein enriched retained fraction and the starch fraction that was separated therefrom. All gave similar yields of oil, with an advantage of using ethanol in terms of oil and starch recovery, yet demonstrating that a variety of solvents with different functional groups and polarities work similarly in the fractionation and recovery. The oil extracted by the different solvents has similar properties to crude corn oil extracted by ordinary wet methods for extracting oil from separated corn germ. Analysis of the oil fraction relative to crude corn oil obtained by conventional refining from corn germ shows a marked increase in the levels of carotenoids demonstrating the enhanced extraction for these components by extraction from the whole flour relative to just extraction from the germ.

Example 3

Ethyl Glucoside Production by Acid Catalyzed Conversion of Ethanol Extracted Starch Ten grams of solvent fractionated corn starch was mixed with 40 ml of 195 proof ethanol. 0.4 grams of toluene sulfonic acid was added and this mixture was heated to 165° C. in an oil bath for 14 minutes. The reaction was quenched in cold water, removed and filtered. A final ethanol filtrate (A) of 32 ml was collected and the precipitate was retained as well (1 gram). Filtrate A was analyzed for ethyl glucoside content and purity shown in Table 8.

TABLE 8

| Sample | Dry solids | ethyl glucosides | Ethyl glucoside purity |
|---|---|---|---|
| filtrate A | 34.5% | 25% | 72% |

Example 4

Ethylacetate Extraction with Base Catalyzed Formation of Starch Esters

Ethylacetate fractionated corn starch (10 grams) was suspended in 50 ml of ethylacetate and 0.6 grams of sodium methoxide was added. This was stirred at 50 C for 1 hour then filtered, washed and dried (sample D). Analysis of sample D indicated a 5.7 percent acetate content, which indicates a degree of substitution of 16% of the starch glucose residues on the starch.

What is claimed is:

1. A method of fractionating corn grain, comprising contacting corn flour with a sufficient amount of at least one $C_1$-$C_6$ organic solvent selected from the group consisting of an alcohol, ketone, ester or furan to form a first admixture having no more than 15% w/w water;
separating the admixture into 1) a first solids fraction enriched with corn fiber and protein and 2) a first liquid organic slurry fraction comprising starch, dissolved corn oil and the organic solvent;
separating starch from the first organic slurry to obtain a solvent extracted solid starch fraction and a clarified organic solution;
retaining the clarified organic solution; and,
evaporating the clarified organic solution to obtain a residue comprised of corn oil.

2. The method of claim 1 further including:
contacting the first solids fraction enriched with corn fiber and protein with a second amount of the organic solvent to form a second admixture having no more than 15% w/w water;
separating the second admixture into 1) a second solids fraction further enriched with the corn fiber and protein and 2) a second liquid organic slurry fraction comprising starch, dissolved corn oil and the organic solvent;
wherein separating starch from the first organic slurry fraction includes combining the first and second liquid organic slurry fractions prior to separating the starch.

3. The method of claim 2 wherein the starch separated from the first and second organic slurry fractions totals at least 50% w/w of the starch present in the corn grain.

4. The method of claim 1 wherein separating the starch from the first organic slurry fraction comprises at least one of a density separation and filtration through a mesh.

5. The method of claim 4 wherein the density separation comprises at least one of gravity settling and centrifugation of the first organic slurry fraction.

6. The method of claim 1 further including evaporating the solvent from the solvent extracted solid starch fraction to obtain a purified starch fraction.

7. The method of claim 1 further including evaporating the organic solvent from the separated solids fraction forming a starchy fiber and protein enriched product.

8. The method of claim 2 wherein separating the organic slurry fractions from the starch comprises sieving at least one of the first and second admixtures through openings of a size corresponding to a maximum of 80 mesh and a minimum of 200 mesh, wherein the organic slurry fractions passes through the openings.

9. The method of claim 1 wherein contacting the corn flour or starch fraction with the organic solvent is done at a temperature between 50° C. and the boiling point of the organic solvent.

10. The method of claim 1 wherein the $C_1$-$C_6$ organic solvent is at least one solvent selected from the group consisting of ethanol, ethyl acetate, and acetone.

11. The method of claim 1 wherein the $C_1$-$C_6$ organic solvent is ethanol.

12. The method of claim 1 wherein the $C_1$-$C_6$ organic solvent is an alcohol of the formula ROH and the solvent extracted starch fraction is further contacted with an acid catalyst for a time sufficient to form an R-glycoside from the recovered starch.

13. The method of claim 1 wherein the $C_1$-$C_6$ organic solvent is an ester of the formula $R_1OOR_2$, where $R_1$ and $R_2$ may have the same or a different number of carbons and the total of carbons from $R_1$ and $R_2$ is 6 or less; and wherein further, the solvent extracted starch fraction is contacted with a base catalyst for a time sufficient to form at least one of a $R_1$ and $R_2$ ester of the starch.

14. The method of claim 1 wherein separating the admixture into the first solids fraction and the first liquid organic slurry fraction comprises, conveying the admixture from a first end through to a second end of a barrel assembly having walls with mesh openings corresponding to a maximum of 80 mesh and a minimum of 200 mesh, wherein the organic slurry fraction is collected as an exit stream from the walls of the barrel assembly and the first solids fraction is collected as exit stream from the second end of the barrel assembly.

15. The method of claim 14 the organic solvent is introduced into the barrel assembly in a flow direction opposite the direction the solids fraction exits from the barrel assembly.

16. The method of claim 1 wherein the admixture has no more than 10% wt/wt water.

17. The method of claim 1 wherein admixture has no more than 5% wt/wt water.

18. The method of claim 1 where the solvent extracted solid starch fraction is resuspended in fresh organic solvent, and the starch is derivitized with a derivitization agent.

19. The method of claim 18 wherein the fresh organic solvent is tetrahydrofuran.

\* \* \* \* \*